W. H. FORSYTH.
CAR VESTIBULE DIAPHRAGM.
APPLICATION FILED NOV. 14, 1913.
Reissued Jan. 6, 1914.
13,669.
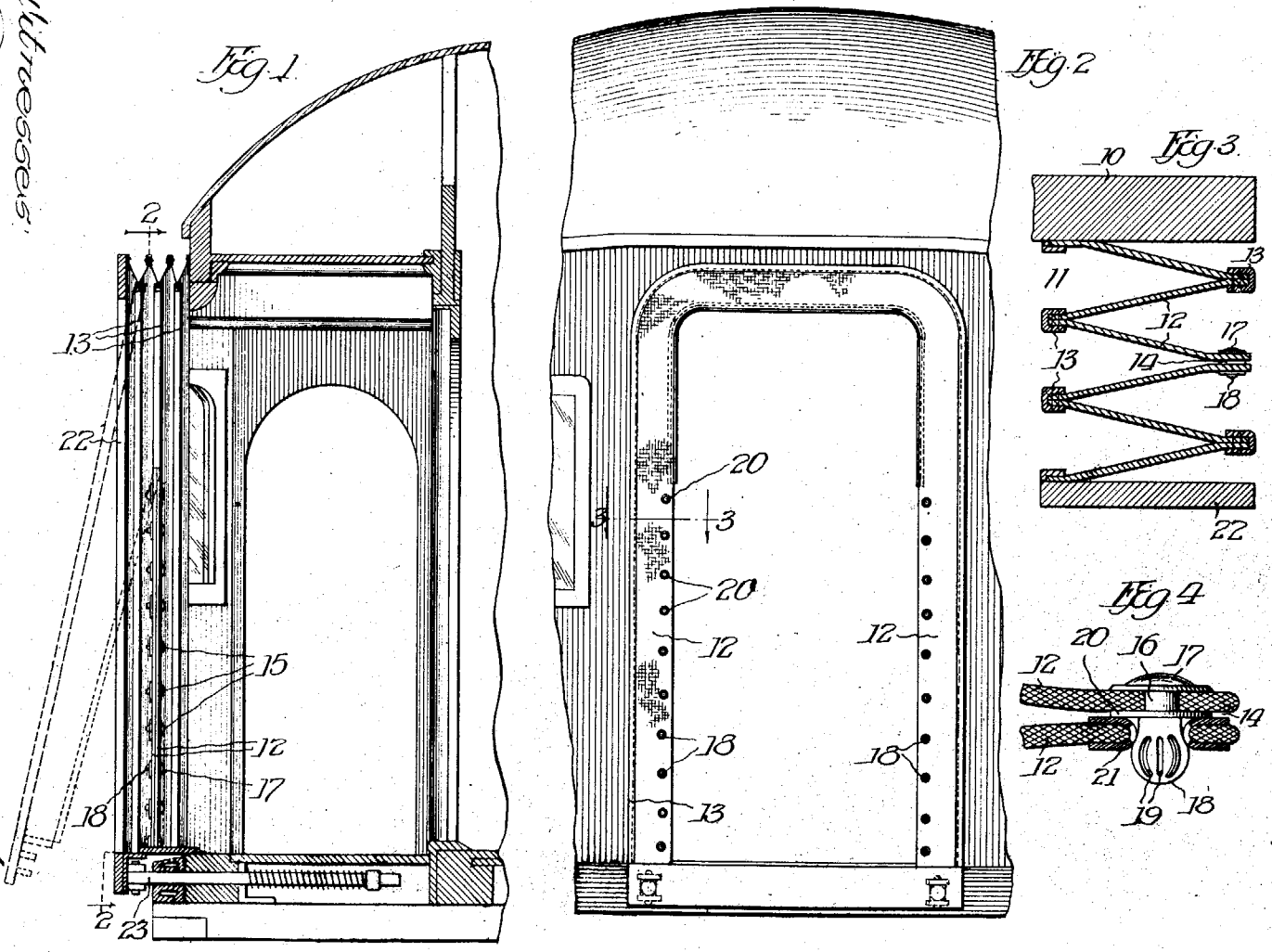
Witnesses:
Geo. E. Davison
Louis J. Geist
Inventor:
William H. Forsyth,
By Lindsay, Bell & Fuller
Attys.

UNITED STATES PATENT OFFICE.

WILLIAM H. FORSYTH, OF CHICAGO, ILLINOIS, ASSIGNOR TO THE CURTAIN SUPPLY COMPANY, OF CHICAGO, ILLINOIS, A CORPORATION OF NEW JERSEY.

CAR-VESTIBULE DIAPHRAGM.

Specification of Reissued Letters Patent. Reissued Jan. 6, 1914.

13,669.

Original No. 1,056,407, dated March 18, 1913, Serial No. 713,219. Application for reissue filed November 14, 1913. Serial No. 801,084.

*To all whom it may concern:*

Be it known that I, WILLIAM H. FORSYTH, a citizen of the United States, residing at Chicago, in the county of Cook and State of Illinois, have invented certain new and useful Improvements in Car-Vestibule Diaphragms, of which the following is a specification.

In many styles of railway cars it is customary to use extensible diaphragms which are collapsible and accordion-shaped. It is often desirable or necessary to tilt the outer face plate to which the diaphragm is attached in order to obtain access to the buffer mechanism of the car. Heretofore, considerable difficulty has been experienced in thus tilting the face plate on account of the fact that when this operation is performed the plaits of the diaphragm are very apt to become torn.

In the co-pending application of Stanley W. Midgley, Serial No. 691,347, filed April 17, 1912, a diaphragm is described in which many of the faults of the prior construction have been overcome, since provision is there made for having at least one of the plaits in each leg of the diaphragm composed of two separate pieces of fabric, which are attached to each other by means of studs, in the ends of which are placed cotter pins. It is moreover old in the art to provide a separable connection between the vestibule plates and the diaphragm, also controlled by manually releasable fastening means such as cotter pins. The disadvantages of those constructions is that if, through carelessness, a workman neglects to remove the cotter pins before the outer face plate is tilted, the diaphragm is subjected to considerable pressure and is apt to become torn or otherwise injured.

In my improved construction, I arrange for the automatic release of the fastening means and, preferably, provide at least one of the plaits in each leg of the diaphragm with a slit which extends to the bottom of the diaphragm. The edges of these slits are connected by fastening devices, which are automatically released when the outer face plate is tilted, and one edge of the slit is thereby forcibly pulled from the other edge. In this way it is impossible for the diaphragm to become torn or injured through the negligence of a workman. These and other advantages of my invention will be more readily understood by reference to the accompanying drawings, which represent a preferred embodiment of my improvements, and in which—

Figure 1 is a longitudinal vertical section through the end portion of a car; Fig. 2 is a transverse vertical section taken on the line 2—2 of Fig. 1; Fig. 3 is an enlarged horizontal cross section on the line 3—3 of Fig. 2; Fig. 4 is an enlarged horizontal section showing the construction of one of the fastening devices.

To one face of the end wall or inner face plate 10 of the car vestibule is fastened, by means of a metallic strip 11, one end of an inverted U-shaped accordion diaphragm composed of a plurality of inverted U-shaped strips of fabric 12 which are fastened together along their longitudinal edges in any suitable manner, as, for example, by the binding strips 13. Near the center of the diaphragm, one of the plaits thereof is allowed to remain open at its lower portion, thereby forming the slit 14 between the edges of the fabric 12. To the edges of the fabric adjacent to the slit 14 are attached a plurality of fastening devices represented as a whole by 15.

Any suitable type of fastening device the parts of which become separated on the application of a pull exerted on one edge in a direction away from the opposite edge may be used in connection with my device, but one preferred type of fastening device is illustrated in Fig. 4. This fastening device comprises a shaft 16 having a head 17 and an expanded end 18 composed of spring material having therein the slots 19. Engaging the short shaft or shank 16 are the washers 20 which engage opposite surfaces of the fabric 12. The material 12 on the opposite side of the slit 14 is provided with a ring 21, the edges of which are bent over the fabric 12, and thereby the ring is securely held in position. It will now be apparent that when the edges of the two strips of fabric are separated from each other, the body 18 of one portion of the fastening device may be passed through the aperture in the ring 21, and the spring material of which this body is composed is thereby compressed. When the parts are brought into the position illustrated in Fig. 4, the spring material of the body 18 expands, and the two strips of the fabric 12 are thereby attached to each other, but on the application of a pull on one strip of fabric in a direction away from the other strip, these strips may readily be separated from each other without damage.

To the front end of the diaphragm is attached an outer face plate 22 of the usual and well known construction, the end of this face plate coöperating with the buffer mechanism of the car represented as a whole by 23.

When it is desired to tilt the outer face plate 22 into the position represented in dotted lines in Fig. 1, in order to obtain access to the buffer mechanism 23, the edges of the fabric 12 on opposite sides of the slit 14 are separated from each other on account of the ready release of the fastening devices attached to these edges. When the face plate is returned to its normal position, the body portion 18 of each fastening device may be readily passed through the coöperating ring 21, and the edges of the strips of fabric 12 are thereby attached to each other.

It will be apparent to those skilled in the art that many changes could be made in the detail construction of the parts which I have described without departing from the spirit or scope of my invention.

I claim:

1. A car vestibule construction for a single car including face plates and an expansible diaphragm connected thereto and bridging the space therebetween, the legs of said vestibule construction including separable portions, and fastening means for holding together the separable portions, said fastening means adapted to be automatically released on tilting one of the face plates to which the diaphragm is attached, substantially as described.

2. A car vestibule construction for a single car including face plates and an expansible diaphragm connected thereto and bridging the space therebetween, the legs of said vestibule construction including portions separable upon a substantially vertical plane, and fastening means for holding together the separable portions, said fastening means adapted to be automatically released on tilting one of the face plates to which the diaphragm is attached, substantially as described.

3. A car vestibule diaphragm for a single car, each leg of which includes portions separable upon a substantially vertical plane, and fastening means for holding together the separable portions of each leg, said fastening means adapted to be automatically released on tilting of that face plate to which the diaphragm is attached, substantially as described.

4. A car vestibule diaphragm of accordion form having a plait in each leg provided with a slit therein, and fastening means for holding together the edges of the material adjacent to said slit, said fastening means adapted to be automatically released on tilting of the face plate to which the diaphragm is attached, substantially as described.

5. A car vestibule diaphragm of accordion form having a plait in each leg provided with a slit therein, and coöperating fastening means on the edges of the fabric adjacent to said slit, said fastening means adapted to be automatically released on the application of a pull on the fabric on one side of said slit in a direction away from the fabric on the opposite side of said slit, whereby on tilting the face plate to which said diaphragm is attached to give access to the buffer mechanism said plate is automatically opened and tearing thereof is avoided, substantially as described.

WILLIAM H. FORSYTH.

Witnesses:

R. S. Reynolds,

Geo. Reidenbach.